United States Patent
Luo et al.

(10) Patent No.: US 12,510,786 B2
(45) Date of Patent: Dec. 30, 2025

(54) FRONT LIGHT GUIDE MODULE, TOUCH DISPLAY DEVICE, AND MANUFACTURING METHOD OF TOUCH DISPLAY DEVICE

(71) Applicant: TPK Glass Solutions (Xiamen) Inc., Fujian (CN)

(72) Inventors: Jian Xing Luo, Nanping (CN); Kai Lun Dai, Zhangzhou (CN)

(73) Assignee: TPK Glass Solutions (Xiamen) Inc., Xiamen (CN)

(*) Notice: Subject to any disclaimer, the term of this patent is extended or adjusted under 35 U.S.C. 154(b) by 0 days.

(21) Appl. No.: 18/829,486

(22) Filed: Sep. 10, 2024

(65) Prior Publication Data

US 2025/0138368 A1 May 1, 2025

(30) Foreign Application Priority Data

Oct. 30, 2023 (CN) ............ 202311423225.3

(51) Int. Cl.
*G02F 1/1333* (2006.01)
*F21V 8/00* (2006.01)
*G02F 1/1335* (2006.01)

(52) U.S. Cl.
CPC ..... *G02F 1/133616* (2021.01); *G02B 6/0031* (2013.01); *G02B 6/0083* (2013.01); *G02F 1/13338* (2013.01); *G02F 2203/02* (2013.01)

(58) Field of Classification Search
CPC .. G02B 6/0031; G02B 6/0036; G02B 6/0055; G02B 6/0083; G02B 6/004; G02F 1/133616; G02F 1/13338; G02F 2203/02
See application file for complete search history.

(56) References Cited

U.S. PATENT DOCUMENTS

| | | | | |
|---|---|---|---|---|
| 10,359,558 B2* | 7/2019 | Tai | ............ | G02B 6/0061 |
| 2015/0117054 A1 | 4/2015 | Tai et al. | | |
| 2016/0282971 A1* | 9/2016 | Zenner | ............ | G06F 3/041 |
| 2020/0411599 A1* | 12/2020 | Yang | ............ | G06F 1/1643 |
| 2023/0185009 A1* | 6/2023 | Tian | ............ | G02B 6/0018 |
| | | | | 362/615 |

(Continued)

FOREIGN PATENT DOCUMENTS

| | | | | |
|---|---|---|---|---|
| CN | 111339896 A | * | 4/2013 | ........ G02B 6/0088 |
| CN | 104235689 A | * | 12/2014 | |
| JP | 2013545247 A | * | 12/2013 | |

(Continued)

*Primary Examiner* — Fatima N Farokhrooz
(74) *Attorney, Agent, or Firm* — Cooper Legal Group, LLC (57) ABSTRACT

A front light guide module disposed on a reflective display includes a light guide plate, a light source module, and a composite light path adjustment layer. The light source module includes a flexible circuit board and a plurality of light-emitting diodes. The light-emitting diodes are disposed on an opaque reflective surface of the flexible circuit board. A vertical distance from a top surface of each of the light-emitting diodes to the flexible circuit board is smaller than or equal to a vertical distance from a top surface of the light guide plate to the flexible circuit board. The composite light path adjustment layer includes a reflective layer and a light-shielding layer. An average brightness of the front light guide module on the reflective display is larger than 120 $cd/m^2$, with a brightness uniformity that is larger than 80%.

19 Claims, 7 Drawing Sheets

(56) References Cited

U.S. PATENT DOCUMENTS

2024/0134107 A1* 4/2024 Huang ................ G02B 6/0088
2025/0028109 A1* 1/2025 Lee ..................... G02B 6/0033

FOREIGN PATENT DOCUMENTS

| KR | 20080038910 A | * | 5/2008 | |
|----|---------------|---|--------|---|
| TW | 201835654 A | | 10/2018 | |
| TW | 202328776 A | | 7/2023 | |
| WO | WO-2023016162 A1 | * | 2/2023 | ....... G02F 1/133616 |

* cited by examiner

FRONT LIGHT GUIDE MODULE, TOUCH DISPLAY DEVICE, AND MANUFACTURING METHOD OF TOUCH DISPLAY DEVICE

CROSS-REFERENCE TO RELATED APPLICATION

The instant application claims priority to China Patent Application 202311423225.3, filed on Oct. 30, 2023, which is incorporated herein by reference.

FIELD OF DISCLOSURE

The present disclosure relates to a front light guide module, a touch display device comprising the touch display device, and a manufacturing method of the touch display device.

BACKGROUND OF THE DISCLOSURE

In the era of information exploration, people need to read books, documents, and instant messages extensively every day. However, conventional liquid crystal displays (LCD) and organic light-emitting diode (OLED) displays are not well-suited for prolonged reading. As a result, reflective displays such as electrophoretic displays (EPD) and cholesteric liquid crystal display (CLCD) have gradually gained increased attention.

Generally, reflective display devices are usually designed with front light guide plates to provide display functions in dark- or low-light conditions. However, when touch panels are further integrated into reflective display devices to form touch display devices, front light guide plates become an unfavorable factor to meet the thin design requirement. Currently, reducing the thickness of the light guide plate is considered one of the solutions for the aforementioned problem. However, a thinned light guide plate can easily cause other problems leading to optical defects or structural defects in the touch display device, such as insufficient structural stability, inadequate brightness, hot spots problems, etc. Therefore, finding a balance between the thin design of the touch display device, structural stability, and optical performance is currently worth studying.

SUMMARY

According to some embodiments of the present disclosure, a front light guide module disposed on the reflective display comprises a light guide plate, a light source module, and a composite light path adjustment layer. The light guide plate has a thickness from 0.1 mm to 0.3 mm and comprises a top surface, a bottom surface facing away from the top surface, and a side-lit surface interconnecting the top surface and the bottom surface, wherein at least one of the top surface or the bottom surface is equipped with a plurality of optical microstructures. The light source module comprises a flexible circuit board and a plurality of light-emitting diodes. The flexible circuit board has an opaque reflective surface and carries a portion of the light guide plate. The light-emitting diodes are disposed on the opaque reflective surface of the flexible circuit board and disposed in coplanar with the light guide plate. The light-emitting diodes face the side-lit surface. A vertical distance from a top surface of any one of the light-emitting diodes to the flexible circuit board is smaller than or equal to a vertical distance from the top surface of the light guide plate to the flexible circuit board. The composite light path adjustment layer comprises a reflective layer and a light-shielding layer. The reflective layer covers the light-emitting diodes and a portion of the top surface of the light guide plate. The light-shielding layer is stacked on the reflective layer and relatively away from the light-emitting diodes and the light guide plate compared to the reflective layer. An average brightness of the front light guide module on the reflective display is larger than 120 cd/m$^2$, and a brightness uniformity of the front light guide module on the reflective display is larger than 80%.

In some embodiments of the present disclosure, the plurality of light-emitting diodes are arranged at intervals, and a pitch of any adjacent two of the light-emitting diodes is from 1.5 mm to 20 mm.

In some embodiments of the present disclosure, a vertical distance from a light-emitting surface of any one of the light-emitting diodes to the side-lit surface of the light guide plate is from 0.01 mm to 0.6 mm.

In some embodiments of the present disclosure, the light source module is an unshielded light source.

In some embodiments of the present disclosure, the side-lit surface of the light guide plate is substantially a flat surface.

According to some embodiments of the present disclosure, a touch display device comprises a reflective display, a front light guide module, a touch sensor, and a cover. The touch sensor is disposed over the reflective display. The front light guide module is disposed between the reflective display and the touch sensor. The cover is disposed over the touch sensor and relatively away from the front light guide module compared to the touch sensor.

In some embodiments of the present disclosure, the touch display device further comprises a first adhesive layer, a second adhesive layer, and a third adhesive layer. The first adhesive layer is disposed between the touch sensor and the front light guide module. The second adhesive layer is disposed between the front light guide module and the reflective display. The third adhesive layer is disposed between the cover and the touch sensor. A thickness of the third adhesive layer is larger than a thickness of the first adhesive layer and larger than a thickness of the second adhesive layer respectively.

According to some other embodiments of the present disclosure, a manufacturing method of the touch display device comprises: laminating a touch sensor to a first side of the front light guide module through a first adhesive layer; laminating a reflective display to a second side of the front light guide module through a second adhesive layer, wherein the first side and the second side of the front light guide module face away from each other; laminating a cover having a shielding layer to the touch sensor through a third adhesive layer, such that the cover and the front light guide module are located on two opposite sides of the touch sensor, wherein the shielding layer faces the touch sensor and is in contact with the third adhesive layer; and a thickness of the third adhesive layer is larger than a thickness of the first adhesive layer and larger than a thickness of the second adhesive layer.

In some embodiments of the present disclosure, laminating the cover to the touch sensor is carried out after laminating the touch sensor and laminating the reflective display to the front light guide module.

In some embodiments of the present disclosure, the thickness of the first adhesive layer and the thickness of the second adhesive layer are respectively from 50 mm to 75 mm, and the thickness of the third adhesive layer is from 100 mm to 125 mm.

According to the aforementioned embodiments of the present disclosure, based on the configuration of the light guide plate, light source module, and composite light path adjustment layer within the front light guide module, it can be ensured that the thinning of the light guide plate to accommodate the thin (slim) design of the front light guide module does not affect the overall optical performance and the structural stability of the front light guide module. In addition, when a thinned front light guide module is integrated into a touch display device, the design of using multiple adhesive layers not only avoids increasing the overall thickness of the touch display device, but also effectively prevents low lamination yield caused by the structural discontinuities (gaps) in the shielding layer of the cover.

BRIEF DESCRIPTION OF THE DRA WINGS

To better understand the aforementioned and other objectives, novel features, advantages, embodiments, and the effect of the present disclosure, diagrams are provided as follows.

DETAILED DESCRIPTION

A plurality of embodiments of the present disclosure will be disclosed below with reference to drawings. For purpose of clear illustration, many details in practice will be provided together with the following descriptions. However, these detailed descriptions in practice are for illustration only, and should not be interpreted to limit the scope, applicability, or configuration of the present disclosure in any way. That is, in some embodiments of the present disclosure, these details in practice are not necessary. Furthermore, for purpose of simplifying drawings, some structures and components of the prior art shown in the drawings will be illustrated schematically. For better illustration, the terms of relative directions, for example, "top" and "bottom" are used in the present disclosure to describe the positional relations of a component with respect to the other component, as illustrated in figures. Such terms are also applicable to describe relative positions of components not shown in the figures. Furthermore, the terms "first" and "second" in the specifications and claims are used for specifying different components or for distinguishing different embodiments or ranges, which should not be interpreted as the highest value or the lowest value to limit the quantity of the component, or the manufacturing sequence or the sequence of installation of the components.

Figure 1A:
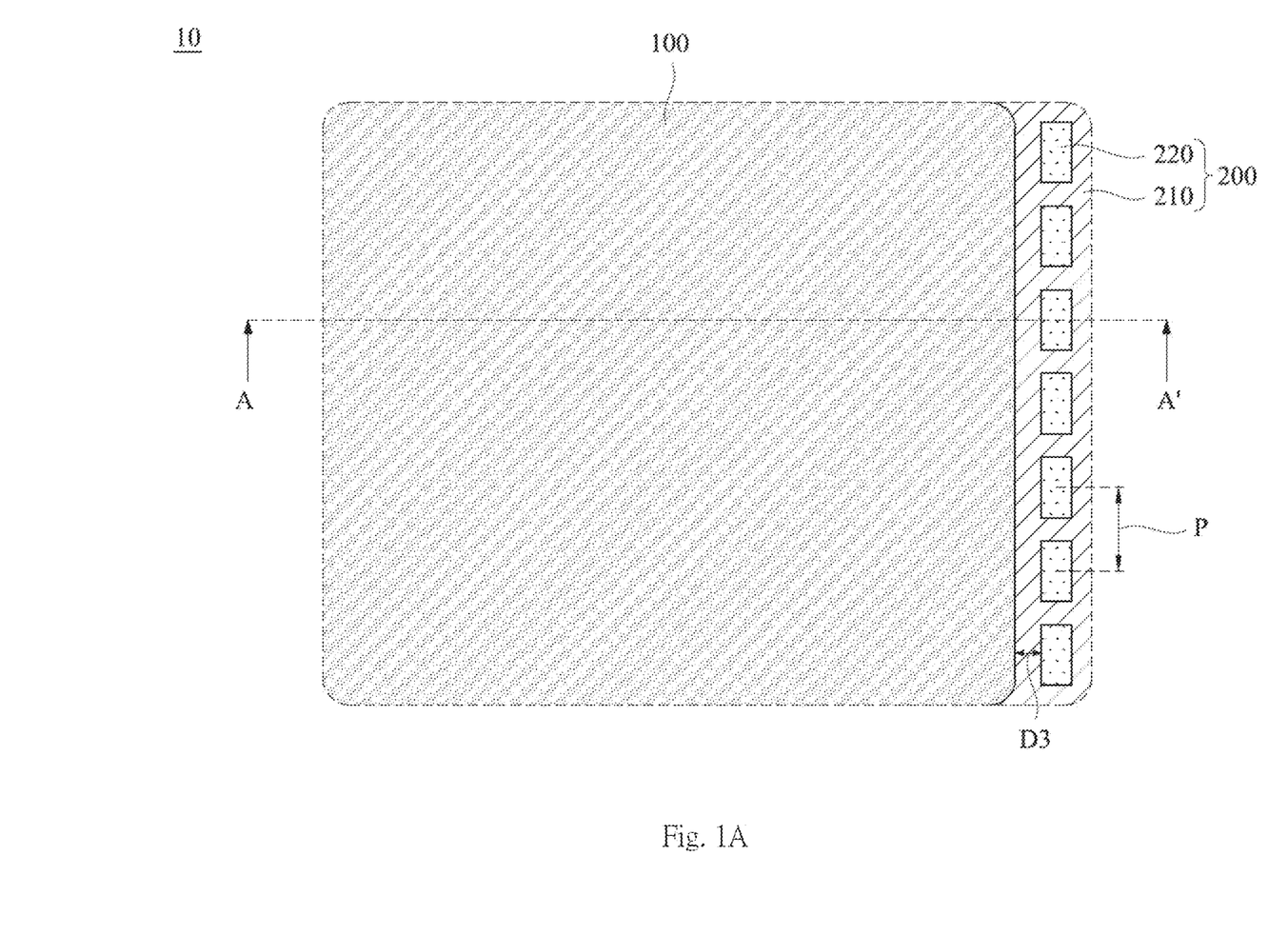
FIG. 1A is a schematic top view of the front light guide module according to some embodiments of the present disclosure.
Figure 1B:
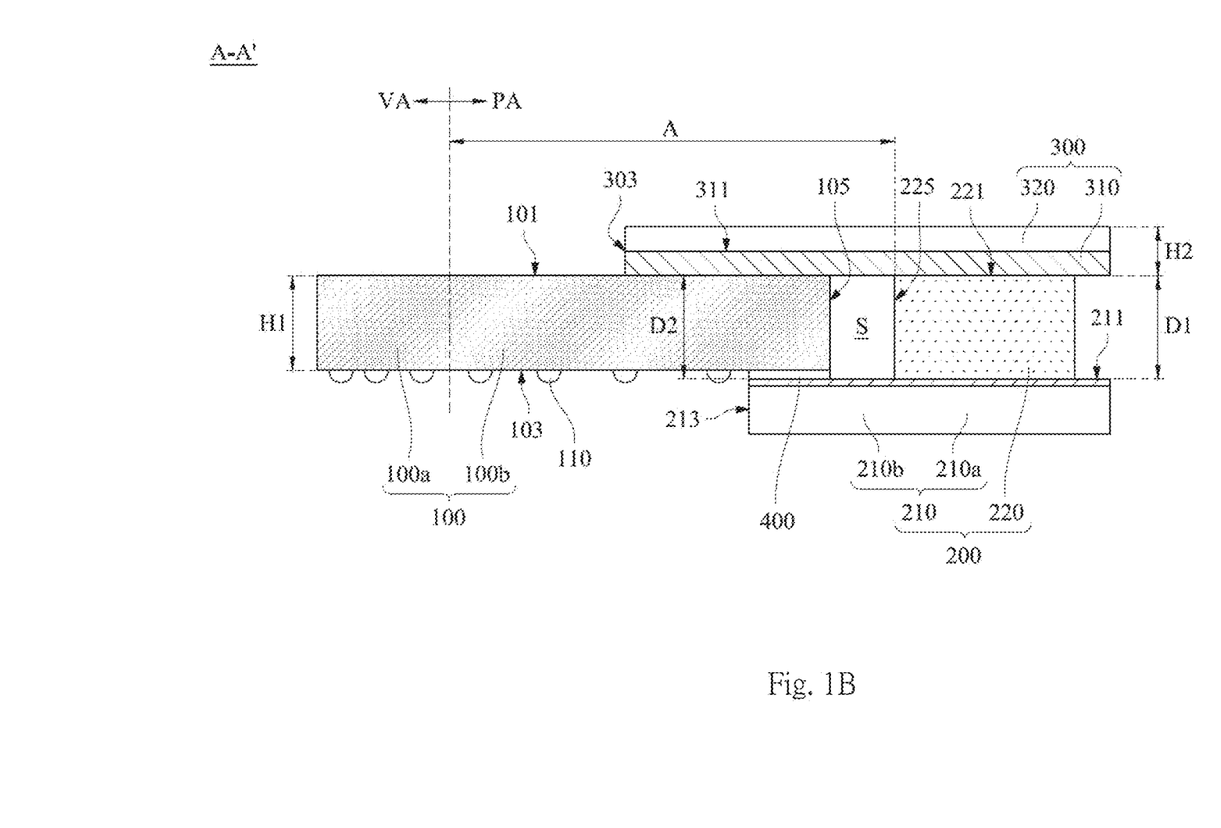
FIG. 1B is a schematic cross-sectional view of the front light guide module of FIG. 1A taken along cutting plane line A-A' in FIG. 1A according to some embodiments of the present disclosure.

Please refer to FIG. 1A and FIG. 1B. FIG. 1A is a schematic top view of the front light guide module 10 according to some embodiments of the present disclosure. FIG. 1B is a schematic cross-sectional view of the front light guide module 10 of FIG. 1A along cutting plane line A-A' according to some embodiments of the present disclosure. For clarity, FIG. 1A only shows the light guide plate 100 and the light source module 200 and skips the composite light path adjustment layer 300 shown in FIG. 1B. The front light guide module 10 comprises a light guide plate 100, a light source module 200, and a composite light path adjustment layer 300. The front light guide module 10 of the present disclosure can be applied to reflective display devices or reflective touch display devices. The light guide plate 100 is designed for guiding light (beams). The light source module 200 provides light to the light guide plate 100 and works in conjunction with the composite light path adjustment layer 300 to increase the light utilization, contributing to the thinning of the front light guide module 10. Detailed explanations of the aforementioned components are provided in the following descriptions.

The light guide plate 100 comprises a top surface 101, a bottom surface 103, and a side-lit surface 105, wherein the top surface 101 is facing away from the bottom surface 103, and the side-lit surface 105 interconnects the top surface 101 and the bottom surface 103 and faces the light-emitting diodes 220 of the light source module 200. At least one of the top surface 101 or the bottom surface 103 of the light guide plate 100 is equipped with a plurality of optical microstructures 110. The optical microstructures 110 is used for disrupting the total internal reflection within the light guide plate 100, allowing the light guide plate 100 to direct a portion of the light towards the reflective display device (not shown in the figure) located below the front light guide module 10. The light reflected by the reflective display device is then uniformly refracted outward, enabling users to view the image on screen. To achieve this function, the design requirements of the light guide plate 100 of the front light guide module 10 of the present disclosure are completely different from the design requirements of the conventional light guide plate of the back light module of liquid crystal display devices which aim to provide sufficient back light to penetrate the liquid crystal display screen. The light guide plate 100 can have a first portion 100a and a second portion 100b. When the front light guide module 10 is applied to a reflective display device, the first portion 100a of the light guide plate 100 can correspond to the visible area VA of the device, and the second portion 100b of the light guide plate 100 can correspond to the peripheral area PA of the device. In some embodiments, the optical microstructures 110 are disposed on the top surface 101 and/or the bottom surface 103 of the first portion 100a and the second portion 100b. To increase light uniformity, the optical microstructures 110 can have a relatively dense distribution type closer to the light source module 200 and a relatively sparse distribution type farther away from the light source module 200. However, the distribution and type of the optical microstructures 110 of the present disclosure is not limited thereto and can be adjusted according to actual needs. In some embodiments, the light guide plate 100 comprises polycarbonate (PC), poly (methyl methacrylate) (PMMA), polyolefin, or combinations thereof, and is preferably designed to be flexible.

To cope with the thin design of front light guide module 10, a thickness H1 of the light guide plate 100 of the present disclosure is from 0.1 mm to 0.3 mm. For example, the thickness H1 of the light guide plate 100 can be 0.15 mm, 0.2 mm, or 0.25 mm. It is worth noting that simply thinning the light guide plate 100 may appear to achieve the goal of the thin design of the front light guide module 10. However, a thinned light guide plate 100 can easily cause other problems leading to optical defects or structural defects of the front light guide module 10. For example, from the structural aspect, the thinned light guide plate 100 has a descended top surface 101, which may create structural discontinuities in height with other components disposed on the same plane. This may results in the need for additional flat layers or thicker adhesive layers to overcome the discontinuities or even require other stacking designs to accommodate spatial allowances. From the optical aspect, the thinned light guide plate 100 may lead to a decrease in light input from the side-lit surface 105, resulting in insufficient brightness. It may also reduce the light-mixing space, causing uneven light distribution (i.e., hotspot problems) near the light input side of the light guide plate 100. Based on the above, in the present disclosure, the light guide plate 100 is not only thinned in response to the thin design of the front light guide module 10, but further improves and resolves various problems arising from thinning the light guide plate 100. This ensures the overall applicability of the front light guide module 10. Detailed embodiments will be described in the following paragraphs.

The light source module 200 comprises a flexible circuit board 210 and a plurality of light-emitting diodes 220, wherein the flexible circuit board 210 has an opaque reflective surface 211 and carries a portion of the light guide plate 100. The light-emitting diodes 220 and the light guide plate 100 are disposed in coplanar on the opaque reflective surface 211 of the flexible circuit board 210, making the front light guide module 10 belong to a comprehensive design of a side-lit source. It should be understood that, in the present disclosure, when describing two components as being disposed in coplanar on a surface, it means that these two components are generally disposed either directly or indirectly on the same surface. The term "disposed indirectly" herein refers to situations where the components are disposed on the surface through a necessary means (such as a necessary spacer). For example, as shown in FIG. 1B, the light guide plate 100 is disposed indirectly on the opaque reflective surface 211 of the flexible circuit board 210 through an adhesive layer 400, in which the adhesive layer 400 is the necessary means for attaching the light guide plate 100 to the opaque reflective surface 211. Similarly, the light-emitting diodes 220 can also be disposed on the opaque reflective surface 211 through a solder layer (not shown in the figure). In addition, the light guide plate 100 and the light-emitting diodes 220, which are disposed in coplanar on the flexible circuit board 210, are arranged adjacent to one another with a gap therebetween without being in direct contact (i.e., the adjacent light guide plate 100 and the light-emitting diodes 220 are spaced apart by a gap). As a result, in the overall structure, a space S is surrounded by the light guide plate 100, the light source module 200, the composite light path adjustment layer 300, and the adhesive layer 400.

The flexible circuit board 210 comprises a base portion 210a and an extension portion 210b that are connected to each other, in which the base portion 210a carries the light-emitting diodes 220, and the extension portion 210b carries a portion of the light guide plate 100. The flexible circuit board 210 can be configured as a multiple-layer structure, with the outermost layer designed as the opaque reflective surface 211. Specifically, when the light-emitting diodes 220 emit light (beams), light scattering issues occur. In such embodiments, the opaque reflective surface 211 is used for controlling the scattered light, directing it more efficiently into the light guide plate 100 through the side-lit surface 105, thereby resolving the issue of reduced light input caused by thinning the light guide plate 100. In some embodiments, the opaque reflective surface 211 of the flexible circuit board 210 covers the entire flexible circuit board 210 to ensure that incident light that is directed at any position on the opaque reflective surface 211 is reflected. In some embodiments, the opaque reflective surface 211 can be directly applied as an ink-coated layer, a chemical plating layer, or an electroplated layer, or can be formed by attaching a white auxiliary material layer to increase light reflectivity.

As an additional note, although a portion of the light guide plate 100 is disposed on the opaque reflective surface 211 through an adhesive layer 400, and while the thickness of the adhesive layer 400 is thin enough that the amount of incident light entering the adhesive layer 400 and its impact can be considered negligible, in some embodiments, the adhesive layer 400 may still be designed as an optically clear adhesive (OCA) with high transmittance to allow a small amount of incident light not entering the light guide plate 100 through the side-lit surface 105 to be reflected by the opaque reflective surface 211, penetrate through the adhesive layer 400, and be redirected back to the light guide plate 100, thereby enhancing the light utilization.

The plurality of light-emitting diodes 220 are aligned with the side-lit surface 105 of the light guide plate 100, with the light-emitting surfaces 225 of the light-emitting diodes 220 facing directly towards the side-lit surface 105 of the light guide plate 100. As described previously, the thin design of the light guide plate 100 may impact the structural stability and optical performance of the front light guide module 10. In order to resolve the structural and optical issues caused by the thinning of the light guide plate 100, the structural design is adjusted in the present disclosure such that a vertical distance from a top surface 221 of each of the light-emitting diodes 220 to the flexible circuit board 210 is smaller than or equal to a vertical distance from the top surface 101 of the light guide plate 100 to the flexible circuit board 210. More specifically, the vertical distance D1 from the top surface 221 of each of the light-emitting diodes 220 to the opaque reflective surface 211 the flexible circuit board 210 is smaller than or equal to the vertical distance D2 from the top surface 101 of the light guide plate 100 to the opaque reflective surface 211 of the flexible circuit board 210. It should be understood that, as described previously, the light guide plate 100 and the light-emitting diodes 220 can be disposed on the flexible circuit board 210 separately through any suitable means, and as long as the vertical distance D1 from the top surface 221 of each of the light-emitting diodes 220 to the flexible circuit board 210 is smaller than or equal to the vertical distance D2 from the top surface 101 of the light guide plate 100 to the flexible circuit board 210, such a design falls within the scope of the present disclosure.

Consequently, since the top surface 221 of each of the light-emitting diodes 220 is not higher than the top surface 101 of the light guide plate 100, it ensures that all light emitted from the light-emitting diodes 220 be directed toward the side-lit surface 105 (i.e., all light travels within a vertical projection area of the side-lit surface 105 toward the light-emitting diodes 220). This prevents light from traveling along a path outside the vertical projection area of the side-lit surface 105 of the light guide plate 100 and thus failing to enter the light guide plate 100 from the side-lit surface 105. Furthermore, such a design can completely avoid the problem of light outside this vertical projection area becoming stray light (noise) that may disturb the light guiding of the light guide plate 100.

On the other hand, the composite light path adjustment layer 300 comprises a reflective layer 310 and a light-shielding layer 320. The reflective layer 310 covers the light-emitting diodes 220 and a portion of the top surface 101 of the light guide plate 100. The light-shielding layer 320 is disposed and stacked on the reflective layer 310 and relatively away from the light-emitting diodes 220 and the light guide plate 100 compared to the reflective layer 310. In other words, the light-shielding layer 320 is stacked on a surface 311 of the reflective layer 310 that is facing away from the light-emitting diodes 220 and the light guide plate 100. More specifically, the reflective layer 310 and the light-shielding layer 320 both extend from the top surface 221 of the light-emitting diodes 220 to the top surface 101 of the light guide plate 100 and completely cover the space S between the light-emitting diodes 220 and the light guide plate 100. In addition, the space S is located between the reflective layer 310 and the opaque reflective surface 211 of the flexible circuit board 210 along the direction vertical to the top surface 101 of the light guide plate 100. Therefore, light traveling within the space S is more concentrated as it enters the light guide plate 100 from the side-lit surface 105 through the reflection from the reflective layer 310 and the opaque reflective surface 211 of the flexible circuit board 210, thereby resolving the problem of the potential reduction in light intake that may occur due to the thinning of the light guide plate 100.

Furthermore, the light-shielding layer 320 is disposed relatively closer to the user compared to the reflectively layer 310 and is used for absorbing or shielding various outward-emitting light in the peripheral area PA, thereby preventing any impact on the user's visual experience. For example, the light-shielding layer 320 can absorb or shield light that directly penetrates through the reflective layer 310.

In some embodiments, when viewed from top (i.e., from the view in FIG. 1A), the reflective layer 310 and the light-shielding layer 320 can completely overlap. In other words, the vertical projection of the reflective layer 310 and the vertical projection of the light-shielding layer 320 toward the flexible circuit board 210 completely overlap, thereby achieving a better light-shielding effect. In some embodiments, an inner sidewall 303 of the composite light path adjustment layer 300 is relatively closer to the visible area VA compared to the inner sidewall 213 of the flexible circuit board 210. In other words, the inner sidewall 303 of the composite light path adjustment layer 300 is relatively away from the light-emitting diodes 220 compared to the inner sidewall 213 of the flexible circuit board 210. This ensures that the light can still be reflected and shielded by the composite light path adjustment layer 300 after being reflected by the opaque reflective surface 211 of the flexible circuit board 210, thereby achieving the effect of stabilizing the light.

In some embodiments, the light-shielding layer 320 can be formed on the reflective layer 310 through any suitable method, wherein the reflective layer 310 can be an ink coating layer, a chemical plating layer, or an electroplated layer, and is preferably white to increase the light reflectivity. The material of the light-shielding layer 320 can be polyimide, tape, etc., and preferably in dark color (such as black) to achieve a better effect of light absorption or light shielding. More specifically, the formation of the composite light path adjustment layer 300 can involve using the light-shielding layer 320 as a substrate, with white ink coated on one surface of the substrate to serve as the reflective layer 310. In some other embodiments, the composite light path adjustment layer 300 can be a substrate with white ink coated on one surface to form a reflective layer 310 and black ink coated on the opposite surface to form a light-shielding layer 320. In some embodiments, the reflective layer 310 is attached to the light guide plate 100 and the light-emitting diodes 220 by an optical adhesive. In some other embodiments, the reflective layer 310 itself can be an adhesive, allowing it to be directly attached to the light guide plate 100 and the light-emitting diodes 220. Overall, a thickness H2 of the composite light path adjustment layer 300 can be from 28 mm to 32 mm to stabilize the light while maintaining thin design.

In some embodiments, as shown in FIG. 1A, the plurality of light-emitting diodes 220 are arranged at intervals on the opaque reflective surface 211 of the flexible circuit board 210 along the side-lit surface 105 of the light guide plate 100. A pitch P of any two adjacent light-emitting diodes 220 is from 1.5 mm to 20 mm (e.g., 1.8 mm). In such embodiments, the pitch P is defined as the distance between the center points of two adjacent light-emitting diodes 220. Additionally, a distance "A" from the position where the light is emitted by each of the light-emitting diodes 220 in the front light guide module 10 to the point where the overall light is uniformly mixed (which may also be referred to as a distance from the light-emitting surface 225 of the light-emitting diodes 220 to the boundary between the visible area VA and the peripheral area VA) can be considered as a light-mixing region of the front light guide module 10. To achieve a better light-mixing effect while meeting the narrow bezel requirements of the product, the design that can satisfy the requirements requires the relationship of "A/P value greater than 0.8." In other words, in the embodiments, by reducing the pitch P of two adjacent light-emitting diodes 220, not only is the difference in brightness and darkness between two adjacent light-emitting diodes 220 minimized, but also the width of the peripheral area PA is reduced, which increases the area of the visible area VA. In some preferable embodiments, a plurality of light-emitting diodes 220 are arranged at equal intervals on the opaque reflective surface 211 of the flexible circuit board 210 to increase the uniformity of light. In some embodiments, for example, the light-emitting diodes 220 can be mini light-emitting diodes (mini-LED). Since the size of the mini light-emitting diodes (mini-LED) is small, more light-emitting diodes 220 can be installed within a given unit volume. This allows more light to enter the light guide plate 100, thereby increasing the overall brightness. Additionally, light-emitting diodes 220 with small size help to reduce the pitch P between the light-emitting diodes 220 in the layout arrangement.

In some embodiments, a vertical distance D3 between the light-emitting surface 225 of the light-emitting diode 220 and the side-lit surface 105 of the light guide plate 100 can range from 0.01 mm to 0.6 mm (e.g., 0.5 mm). Thus, under the condition that the light-emitting diodes 220 are not too far from the light guide plate 100, the gap formed by the vertical distance D3 can ensure the light transmission efficiency from the light-emitting surface 225 of the light-emitting diodes 220 to the side-lit surface 105 of the light guide plate 100, thereby increasing the light intake of the light guide plate 100.

In some embodiments, the light source module 200 is an unshielded light source. In detail, the light-emitting diodes 220 in the light source module 200 are not covered by any shell or housing that acts as a light concentrator. In other words, the light emitted by the light-emitting diodes 220 is not being focused by reflecting from any shell or housing that acts as a light concentrator. Overall, due to the configuration of the opaque reflective surface 211 of the flexible circuit board 210, the design of the vertical distance D1 from the light-emitting diodes 220 to the flexible circuit board 210, the design of the vertical distance D2 from the light guide plate 100 to the flexible circuit board 210, and the configuration of the composite light path adjustment layer 300, most of the light emitted from the light-emitting diodes 220 can enter the light guide plate 100. Therefore, no additional light concentrators are required to increase the light utilization. This avoids structural discontinuities (gaps) between the light source module 200 and the light guide plate 100 due to the large size of a shielded light source, which helps improve the overall structural stability and contributes to the thin design of the entire device.

It is worth mentioning that, in the prior art, using a thicker light guide plate paired with larger-sized light-emitting diodes typically meets the requirement of sufficient light intake. However, the distance between two larger-sized light-emitting diodes tends to be greater, which can lead to uneven light mixing and create obvious bright and dark bands, thus resulting in hot spots. To solve this problem, light absorption layers are usually disposed near the light incident area to absorb the disordered (scattered) light before light enters the light-mixing region, thereby stabilizing the light and resolving the hot spot problems. However, since the light-emitting diodes 220 of the present disclosure can be mini light-emitting diodes with smaller size, the distance between two adjacent light-emitting diodes 220 can be easily reduced in their arrangement. This helps prevent the light emitted by the light-emitting diodes 220 from creating obvious (noticeable) bright and dark bands in the light-mixing region (i.e., the region of the light guide plate 100 close to the side-lit surface 105). Additionally, since a thinned light guide plate 100 is used in the present disclosure, light intake is the primary consideration. Therefore, it is neither necessary nor feasible to dispose light-absorbing layers at the position corresponding to the vertical projection of the light-mixing region, as this would otherwise impact light intake.

On the other hand, in the prior art, in order to stabilize light before the light enters the light-mixing region, light reflective layers (reflectors) are not considered in the design in order to prevent the light from being reflected constantly and thus not stabilized. However, in the present disclosure, due to the design of the small size of the light-emitting diodes 220, hot spot issues are not encountered, and therefore light reflective layers (i.e., the reflective layer 310 and the opaque reflective surface 211 of the flexible circuit board 210 of the present disclosure) can be disposed near the light incident area. This allows the light to be reflected by the functional layers with reflective properties, enhancing the light intake and ensuring that the overall brightness is maintained or even increased in the thin design of the light guide plate 100. Furthermore, since in the present disclosure, functional layers with reflective properties are disposed near the light incident area of the peripheral area PA to enhance light intake, there is no need to dispose additional reflective layers in the visible area VA to improve the brightness of the visible area VA. It should be noted that when a reflective layer is disposed in the visible area VA, the visibility requirements of the visible area VA must be considered, and this often requires using transparent materials for the reflective layers, which may affect the visibility of the visible area VA to a certain extent. Therefore, by not needing additional reflective layers in the visible area VA, the difficulties of material matching and the potential impacts on the visibility of the visible area VA can be prevented.

Additionally, in the prior art, in order to resolve the hot spot problems caused by a large-sized light source, the side-lit surface of the light guide plate is often designed to be a rough surface, such that light is more likely to be reflected multiple times at the side-lit surface and further enters the light guide plate due to the rough surface design of the side-lit surface, thereby enhancing light intake. However, in the present disclosure, based on the design of small-sized light-emitting diodes 220 and the configuration where the light-emitting diodes 220 are sandwiched from top and below between two reflective layers (the reflective layer 310 of the composite light path adjustment layer 300 and the opaque reflective surface 211 of the flexible circuit board 210), the hot spot problems can be resolved and brightness enhanced. Therefore, the side-lit surface 105 of the light guide plate 100 of the present disclosure can be substantially a flat (smooth) surface. In other words, there is no need to further process the side-lit surface 105 of the light guide plate 100 to create a rough surface, thereby simplifying the manufacturing process. Overall, the present disclosure can achieve the effect of enhancing brightness, improving light mixing, stabilizing light, and simplifying manufacturing process.

Figure 4:
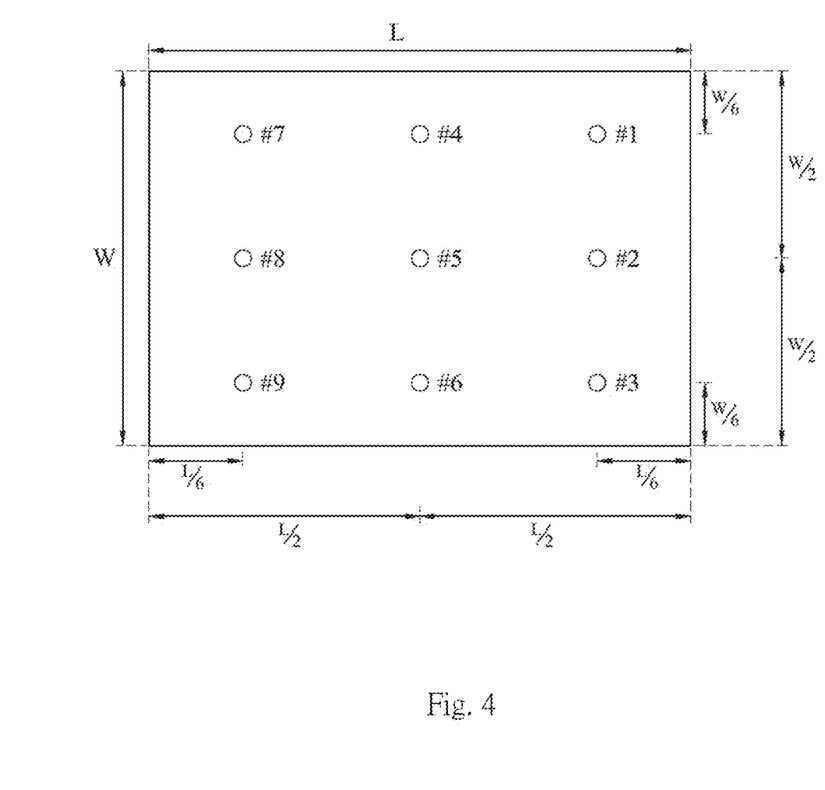
FIG. 4 is a schematic diagram showing the selected measurement points for brightness measurement of the front light guide module according to some embodiments of the present disclosure.

For improving the optical effects such as brightness, light mixing, and light stability, when the front light guide module 10 of the present disclosure is disposed on the reflective display 20, the measured average brightness is larger than 120 cd/m$^2$, and the measured brightness uniformity is larger than 80%. These optical characteristics are verified through various embodiments and comparative examples as described below. In the stacked structure of Comparative Examples 1-4 and Embodiment 1, the front light guide module is disposed on the reflective display. In the stacked structure of Comparative Examples 5-8 and Embodiment 2, the front light guide module and a touch sensor are sequentially disposed on the reflective display, with an adhesive layer (made of acrylic resin or silicone, with a thickness from 50 mm to 75 mm) bonding the front light guide module and the reflective display (and the touch sensor). For measurement, nine test points (labeled as #1-#9) are selected on the light-emitting surface from the top layer (i.e., the front light guide module in Comparative Examples 1-4 and Embodiment 1, and the touch sensor in the Comparative Examples 5-8 and Embodiment 2) of each stacked structure. A luminance meter is used to measure the brightness at these nine test points. Please refer to FIG. 4 for the method of selecting the test points, in which the actual dimensions of the light guide plate (including length L and width W) are used for labelling the test points, and the light-emitting diodes are disposed at the left side (near the side of #7-#9 test points) of the light guide plate. The brightness measurement results for each embodiment and comparative example are shown in Table 1. It should be understood that, without exceeding the scope of the present disclosure, the embodiments shown in Table 1 should not be used to limit the present disclosure.

TABLE 1

| Test point | Brightness (unit: cd/m$^2$) | | | | |
| --- | --- | --- | --- | --- | --- |
| | Comparative Example 1 | Comparative Example 2 | Comparative Example 3 | Comparative Example 4 | Embodiment 1 |
| #1 | 140.18 | 36.48 | 45.19 | 121.97 | 147.41 |
| #2 | 146.47 | 34.07 | 40.92 | 118.62 | 144.23 |
| #3 | 142.71 | 32.97 | 39.67 | 118.84 | 144.74 |
| #4 | 143.92 | 45.93 | 54.29 | 121.21 | 145.76 |
| #5 | 140.75 | 39.56 | 49.23 | 119.00 | 145.88 |
| #6 | 141.72 | 36.26 | 46.81 | 112.87 | 143.84 |
| #7 | 149.18 | 52.75 | 55.82 | 126.41 | 135.21 |
| #8 | 142.94 | 39.12 | 48.13 | 106.25 | 127.58 |
| #9 | 141.52 | 37.36 | 48.92 | 99.21 | 126.59 |
| Average brightness | 143.3 | 39.4 | 47.7 | 116.0 | 127.5 |
| Brightness Uniformity | 93.96% | 62.50% | 71.06% | 78.48% | 85.87% |

| Test point | Brightness (unit: cd/m$^2$) | | | | |
| --- | --- | --- | --- | --- | --- |
| | Comparative Example 5 | Comparative Example 6 | Comparative Example 7 | Comparative Example 8 | Embodiment 2 |
| #1 | 127.6 | 33.2 | 41.12 | 111.0 | 134.1 |
| #2 | 133.3 | 31.0 | 37.24 | 107.9 | 131.3 |
| #3 | 129.9 | 30.0 | 36.10 | 108.1 | 131.7 |
| #4 | 131.0 | 41.8 | 49.40 | 110.3 | 132.6 |
| #5 | 128.1 | 36.0 | 44.80 | 108.3 | 132.8 |
| #6 | 129.0 | 33.0 | 42.60 | 102.7 | 130.9 |
| #7 | 135.8 | 48.0 | 50.80 | 115.0 | 123.0 |
| #8 | 130.1 | 35.6 | 43.80 | 96.7 | 116.1 |
| #9 | 128.8 | 34.0 | 44.52 | 90.3 | 115.2 |
| Average brightness | 130.4 | 35.8 | 43.40 | 105.6 | 127.5 |
| Brightness Uniformity | 93.96% | 62.50% | 71.06% | 78.48% | 85.87% |

[Note 1]

Unless otherwise specified, the stacked structure of the front light guide module in each comparative example and each embodiment is as shown in FIG. 1B. The remaining details are as follows:

Comparative Examples 1 and 5: conventional size of the LED, light guide plate with a thickness H1 of 0.4 mm, and no reflective layer used;

Comparative Examples 2 and 6: conventional size of the LED, light guide plate with a thickness H1 of 0.15 mm, and no reflective layer are used;

Comparative Examples 3 and 7: conventional size of the LED, light guide plate with a thickness H1 of 0.15 mm;

Comparative Examples 4 and 8: mini-LED, light guide plate with a thickness H1 of 0.15 mm, and no reflective layer used;

Examples 1 and 2: mini-LED, light guide plate with a thickness H1 of 0.15 mm.

[Note 2]

The brightness uniformity is calculated as: (minimum brightness/maximum brightness)×100%.

[Note 3]

The conventional size of the LED used in the comparative examples is: 3 mm (length)×0.85 mm (width)×0.4 mm (height).

Please refer to Comparative Examples 1 and 5. The conventional design of non-thinned light guide plates is used in Comparative Examples 1 and 5, meaning a thicker light guide plate and conventional size of the LED are used in Comparative Examples 1 and 5. Therefore, the brightness and brightness uniformity are in compliance. Please refer to Comparative Examples 2, 3, 5, and 6. It can be seen that regardless of whether a reflective layer is used, when the light guide plate is thinned without corresponding reduction in the size of the LED, neither brightness nor brightness uniformity is improved. This provides evidence that the light intake is reduced when simply thinning the light guide plate, leading to insufficient brightness and poor light guiding, which results in lower brightness uniformity. Please refer to Comparative Examples 4 and 8 and Embodiments 1 and 2. It can be seen that when a thinned light guide plate and small size of LED are used, the brightness and brightness uniformity can be significantly improved, in which when a reflective layer is added, the brightness and brightness uniformity can be further enhanced. This demonstrates that the overall stacked structure design (i.e., stacked structure shown in FIG. 1B) of the front light guide module of the present disclosure has a significant effect on improving the optical performance. On the other hand, based on the results of the first set of experiments (Comparative Examples 1-4 and Embodiment 1) and the second set of experiments (Comparative Examples 5-8 and Embodiment 2), it seems that the presence of a touch sensor on the front light guide module does not have significant impact on the optical performance. In addition, since adhesive layers with high transmittance are used, the impact of the adhesive layers on the optical performance in each comparative example and each embodiment is negligible.

Figure 2:
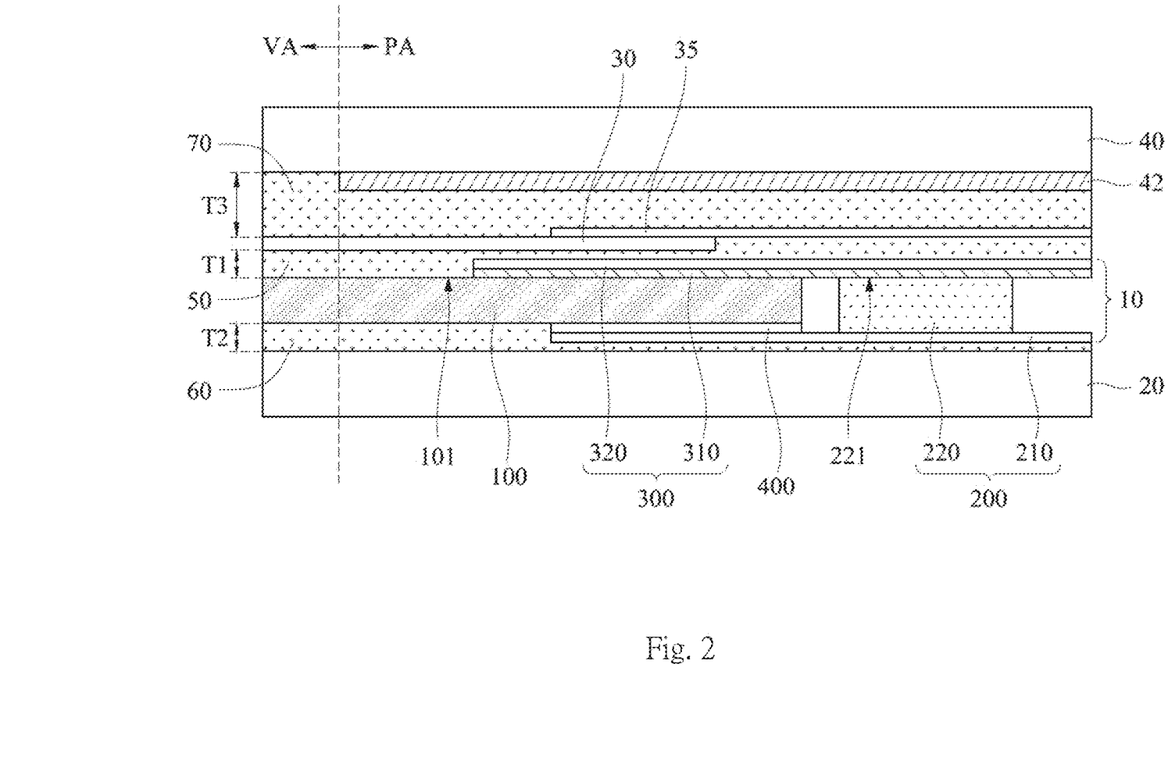
FIG. 2 is a schematic cross-sectional view of the touch display device according to some embodiments of the present disclosure, with the cross-sectional position corresponding to cutting plane line A-A' in FIG. 1A.

Please refer to FIG. 2, which is a schematic cross-sectional view of the touch display device 1 according to some embodiments of the present disclosure, with the cross-sectional position corresponding to cutting plane line A-A' in FIG. 1A. The touch display device 1 has a visible area VA and a peripheral area PA located on at least one side of the visible area VA. The front light guide module 10 of the present disclosure can be integrated into the reflective touch display device 1. More specifically, the touch display device 1 comprises a front light guide module 10, a reflective display 20, and a touch sensor 30. The front light guide module 10 is disposed on the reflective display 20, and the touch sensor 30 is disposed on the front light guide module 10. In other words, the front light guide module 10 is disposed between the reflective display 20 and the touch sensor 30.

The touch display device 1 further comprises a cover 40. The cover 40 is disposed on the touch sensor 30 and relatively away from the front light guide module 10 compared to the touch sensor 30. More specifically, the cover 40 is disposed on the side of the light-emitting surface of the front light guide module 10, which is the side of the top surface 101 of the light guide plate 100. Since the material of the cover 40, such as glass, quartz, or suitable polymers (e.g., polycarbonates (PC) or polymethyl methacrylate (PMMA)), has a certain degree of stiffness, the cover 40 can provide the touch display device 1 with protection. Additionally, a shielding layer 42 is disposed on the side of the cover 40 facing the front light guide module 10 to define the peripheral area PA and enhance concealment of components located on the back side of the cover 40 in the peripheral area PA (e.g., a flexible circuit board 35 connected to the touch sensor 30). The shielding layer 42 can extend from the edge of the cover 40 to the visible area VA, creating a boundary between the defined peripheral area PA and the visible area VA.

It can be seen from the overall stacked structure of the touch display device 1 that, in comparison with the visible area VA, the number of the components in the peripheral area PA is greater, the stacking relationships in the peripheral area PA are more complex, and the heights of the components in the peripheral area PA are more inconsistent. This may easily lead to component damage during the subsequent lamination process. To avoid mechanical interference, the design often requires layout adjustments or openings, which may in turn reduce structural stability. However, in the present disclosure, the light-emitting diodes 220 are designed with reduced thickness to accommodate the thinned light guide plate 100, which helps minimize the structural discontinuities in height between the peripheral area PA and the visible area VA. This approach addresses the problems of structural interference in the peripheral area PA and enhances the overall structural stability. Additionally, it eliminates the need for thicker adhesive layers to overcome significant structural discontinuities in height, thereby achieving a thinner device. Moreover, the thickness H2 of the composite light path adjustment layer 300 (please refer to FIG. 1A) can range from 28 mm to 32 mm. Such a design not only can stabilize the light while maintaining thin design, as previously mentioned, but also reduces the structural discontinuities in height between the visible area VA and the peripheral area PA, thereby enhancing the overall structural stability.

In some embodiments, the touch display device 1 further comprises an adhesive layer to bond each layer. More specifically, the first adhesive layer 50 is disposed between the touch sensor 30 and the front light guide module 10, the second adhesive layer 60 is disposed between the front light guide module 10 and the reflective display 20, and the third adhesive layer 70 is disposed between the cover 40 and the touch sensor 30. In some embodiments, each of the adhesive layers can be an optically clear adhesive (OCA) with high transmittance. To cope with the thin design of the touch display device 1, the thickness T1 of the first adhesive layer 50 and the thickness T2 of the second adhesive layer 60 can be reduced, while the thickness T3 of the third adhesive layer 70 is relatively thicker to compensate for the structural discontinuities created by the shielding layer 42 of the cover 40. This prevents the third adhesive layer 70 from forming bubbles therein during lamination process due to insufficient thickness, which may affect the product yield. In other words, the thickness T3 of the third adhesive layer 70 is larger than the thickness T1 of the first adhesive layer 50, and the thickness T3 of the third adhesive layer 70 is larger than the thickness T2 of the second adhesive layer 60. More specifically, the thickness T3 of the third adhesive layer 70 can range from 100 mm to 125 mm, and each of the thickness T1 of the first adhesive layer 50 and the thickness T2 of the second adhesive layer 60 can range from 50 mm to 75 mm.

Figure 3A:
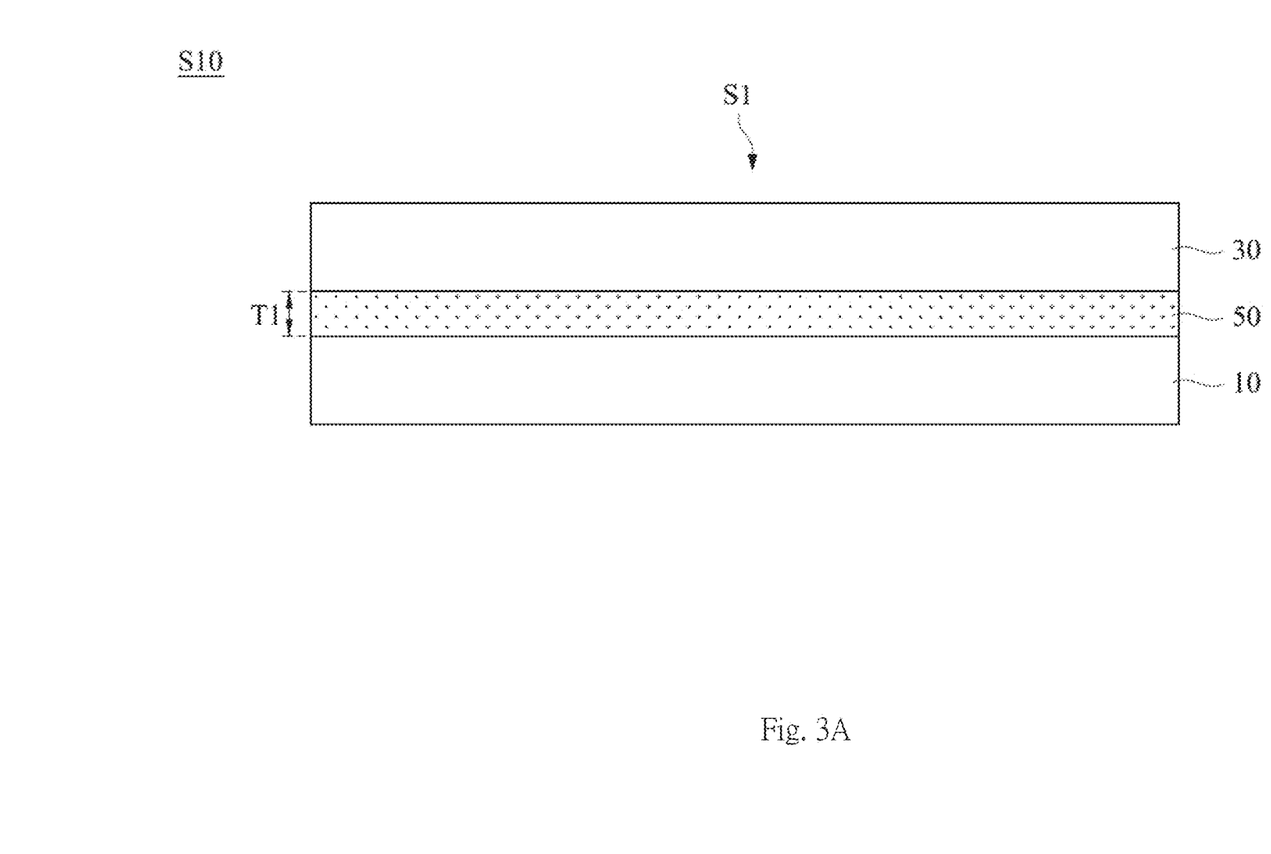
FIG. 3A to FIG. 3C are schematic cross-sectional views of the touch display device at different steps of the manufacturing method thereof according to some embodiments of the present disclosure, with the cross-sectional position corresponding to cutting plane line A-A' in FIG. 1A.
Figure 3B:
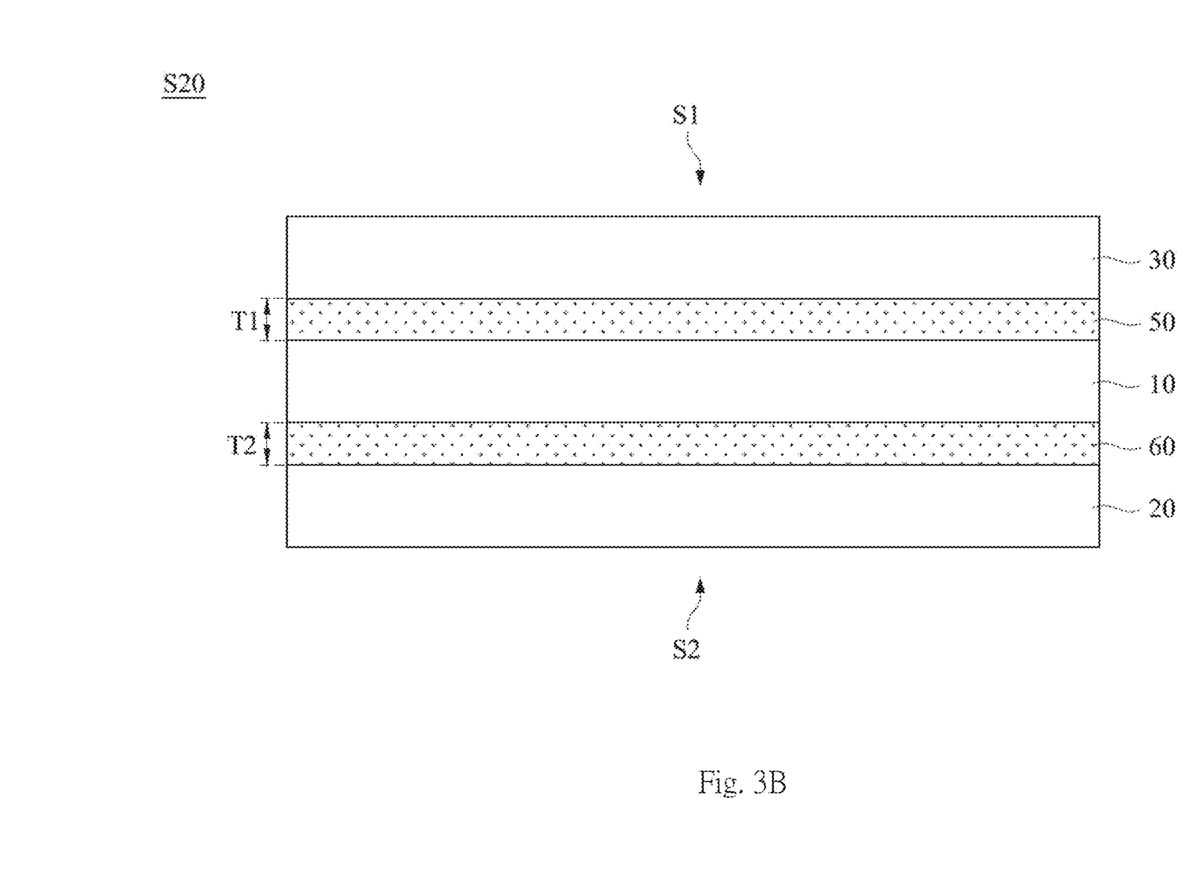
Figure 3C:
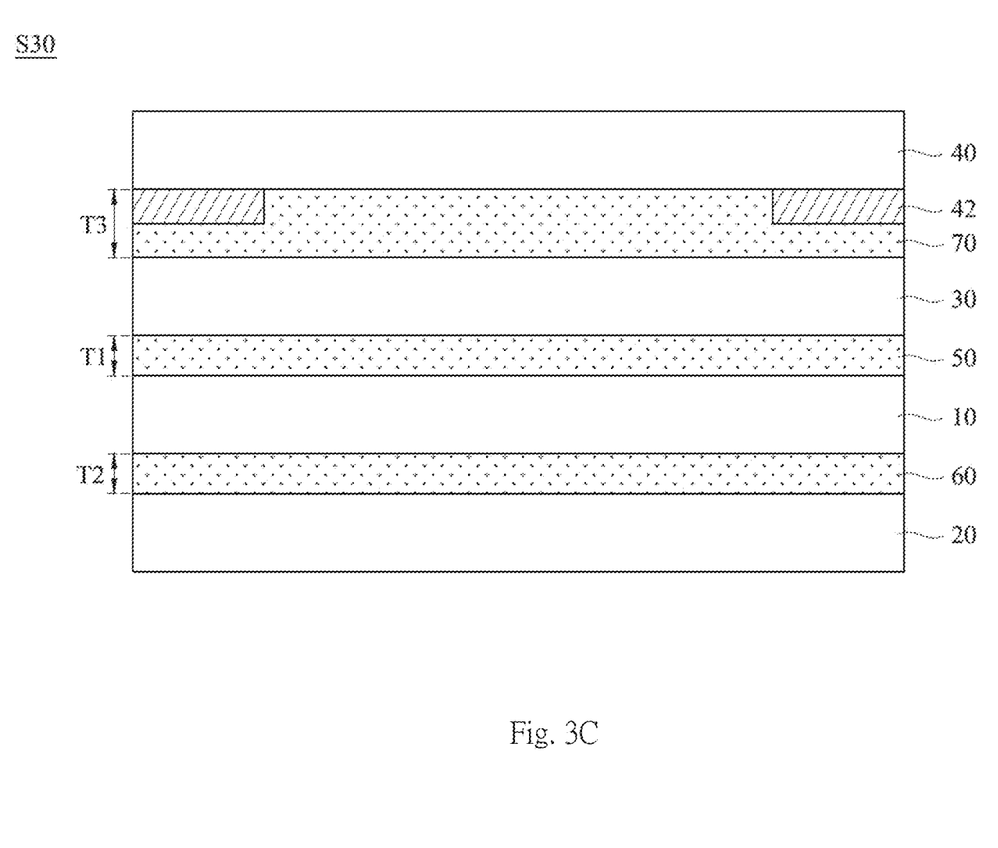

On the other hand, it is understood that when two stiff layers are adhered together during the lamination process, bubbles are more likely to be formed in the stiff layers. Additionally, in practice, after a stiff layer and a flexible layer are adhered together, the overall structure formed tends to exhibit stiffness. Based on this, during the manufacturing process of the touch display device 1 of the present disclosure, the bonding sequence of the lamination process is designed according to the stiffness of each component and the thickness requirements of each aforementioned adhesive layer, in which thicker adhesive layers are used for bonding stiff layers, while thinner adhesive layers are used for bonding where flexible layers are involved. The touch display device 1 of the present disclosure can be formed by sequentially performing the following bonding steps S10 to S30. Please refer to FIG. 3A to FIG. 3C for better understanding. FIG. 3A to FIG. 3C are schematic cross-sectional views of the touch display device 1 at different steps of the manufacturing method thereof according to some embodiments of the present disclosure. For simplicity, rectangular outlines are used to represent the front light guide module 10, the reflective display 20, the touch sensor 30, and the cover 40 in FIG. 3A to FIG. 3C, while the specific structures of each component can be referenced in the previous descriptions. The reflective display 20 and the cover 40 of the present disclosure are considered stiff layers, and the front light guide module 10 and the touch sensor 30 are considered flexible layers.

Please refer to FIG. 3A. In Step S10, the touch sensor 30 is laminated to a first side S1 of the front light guide module 10 through the first adhesive layer 50, in which the first side S1 is the side of light-emitting surface of the front light guide module 10. In other words, step S1 involves lamination between two flexible layers, and the overall structure after lamination remains a flexible layer. Additionally, since step S1 involves lamination between flexible layers, using the first adhesive layer 50 with a smaller thickness T1 does not generate bubbles and contributes to the thin design of the touch display device 1.

Please refer to FIG. 3B. In Step S20, the reflective display 20 is laminated to the second side S2 of the front light guide module 10 through the second adhesive layer 60, in which the second side S2 is facing away from the first side S1. Since the overall structure (the structure shown in FIG. 3A) formed by laminating the touch sensor 30 and the front light guide module 10 is a flexible layer, and the reflective display 20 is a stiff layer, step S20 involves lamination between a flexible layer and a stiff layer, and the overall structure after lamination is a stiff layer. However, since this lamination step also involves a flexible layer, using the second adhesive layer 60 with a smaller thickness T2 does not generate bubbles and contributes to the thin design of the touch display device 1.

Please refer to FIG. 3C. In Step S30, the cover 40 is laminated to the touch sensor 30 through the third adhesive layer 70, in which the shielding layer 42 located on the cover 40 faces the touch sensor 30. After laminating the third adhesive layer 70, the cover 40 and the front light guide module 10 are located on the opposite sides of the touch sensor 30. Since the overall structure (the structure shown in FIG. 3B) formed by laminating the touch sensor 30, the front light guide module 10, and the reflective display 20 is a stiff layer, and the cover 40, as mentioned earlier, is also a stiff layer, step S30 involves laminating two stiff layers. Therefore, using the third adhesive layer 70 with a larger thickness T3 can effectively prevent bubbles from being generated. After step S30 is completed, a touch display device 1, as illustrated in FIG. 2, can be obtained.

Overall, by laminating the touch sensor 30 and the reflective display 20 to the surfaces of the front light guide module 10 (steps S10-S20), and then laminating the cover 40 to the surface of the touch sensor 30 (steps S30), it ensures that the lamination between two stiff layers is done using a thicker adhesive layer and that the structural discontinuities caused by the shielding layer 42 of the cover 40 are filled. This can improve the lamination yield of the product and help the touch display device 1 to pass the product reliability test. After actual testing, the touch display device 1 showed no bubble formation after high-temperature high-humidity test, thermal shock test, and anti-aging test. In some other embodiments, the reflective display 20 may be laminated to one surface of the front light guide module 10 first, followed by laminating the touch sensor 30 to the other surface of the front light guide module 10, which means performing step S20 before Step S10. With this lamination sequence, since both steps S10 and steps S20 involve lamination between a flexible layer and a stiff layer, bubbles are also less likely to be formed.

According to the aforementioned embodiments of the present disclosure, based on the configuration of the light guide plate, light source module, and composite light path adjustment layer within the front light guide module, it can be ensured that the thinning of the light guide plate to accommodate the thin (slim) design of the front light guide module does not affect the overall optical performance and the structural stability of the front light guide module. In addition, when a thinned front light guide module is integrated into the touch display device, the design of using multiple adhesive layers not only avoids increasing the overall thickness of the touch display device, but also effectively prevents low lamination yield caused by the structural discontinuities (gaps) in the shielding layer of the cover. The design can balance the thin design of the touch display device and product performance, ensuring that the touch display device maintains a good lamination yield and can pass product reliability tests despite the thin design.

The aforementioned embodiments are presented to disclose the present disclosure, which should not be interpreted to limit the scope, applicability, or configuration, of the present disclosure in any way. Those skilled in the art may use any alternative embodiments that are modified or changed without departing from the spirit and scope of the present disclosure and should be included in the appended claims.

COMPONENT SYMBOLS

1: touch display device
10: front light guide module
20: reflective display
30: touch sensor
35: flexible circuit board
40: cover
42: shielding layer
50: first adhesive layer
60: second adhesive layer
70: third adhesive layer
100: light guide plate
100a: first portion
100b: second portion
101: top surface
103: bottom surface
105: side-lit surface
110: optical microstructures
200: light source module
210: flexible circuit board
210a: base portion
210b: extension portion
211: opaque reflective surface
213: inner sidewall
220: light-emitting diodes
221: top surface
225: light-emitting surface
300: composite light path adjustment layer
303: inner sidewall
310: reflective layer
311: surface
320: light-shielding layer
400: adhesive layer
H1, H2: thickness
D1, D2, D3: vertical distance
T1, T2, T3: thickness
PA: peripheral area
VA: visible area
P: pitch
S: space
A: distance
A-A': cutting plane line
S10~S30: step

What is claimed is:

1. A front light guide module, disposed on a reflective display, comprising:
   a light guide plate having a thickness from 0.1 mm to 0.3 mm and comprising a top surface, a bottom surface facing away from the top surface, and a side-lit surface interconnecting the top surface and the bottom surface, wherein at least one of the top surface or the bottom surface is equipped with a plurality of optical microstructures;
   a light source module comprising:
      a flexible circuit board having an opaque reflective surface and carrying a portion of the light guide plate; and
      a plurality of light-emitting diodes disposed on the opaque reflective surface of the flexible circuit board and disposed in coplanar with the light guide plate, wherein the light-emitting diodes face the side-lit surface, and a vertical distance from a top surface of any one of the light-emitting diodes to the flexible circuit board is smaller than or equal to a vertical distance from the top surface of the light guide plate to the flexible circuit board;
   a composite light path adjustment layer comprising:
      a reflective layer covering the light-emitting diodes and a portion of the top surface of the light guide plate; and a light-shielding layer stacked on the reflective layer and relatively away from the light-emitting diodes and the light guide plate compared to the reflective layer; and a visible area, a peripheral area, and a shielding layer overlying the composite light path adjustment layer, wherein a distance between the shielding layer and a boundary where the visible area meets the peripheral area is less than a distance between the composite light path adjustment layer and the boundary where the visible area meets the peripheral area, wherein an average brightness of the front light guide module on the reflective display is larger than 120 cd/m$^2$, and a brightness uniformity of the front light guide module on the reflective display is larger than 80%.

2. The front light guide module of claim 1, wherein the light-emitting diodes are arranged at intervals, and a pitch of any adjacent two of the light-emitting diodes is from 1.5 mm to 20 mm.

3. The front light guide module as claimed in claim 1, wherein a vertical distance from a light-emitting surface of any one of the light-emitting diodes to the side-lit surface of the light guide plate is from 0.01 mm to 0.6 mm.

4. The front light guide module of claim 1, wherein the side-lit surface of the light guide plate is substantially a flat surface.

5. A touch display device, comprising:
a reflective display;
a touch sensor disposed over the reflective display;
the front light guide module of claim 1 disposed between the reflective display and the touch sensor; and
a cover disposed over the touch sensor and relatively away from the front light guide module compared to the touch sensor.

6. A manufacturing method of a touch display device, comprising:
laminating a touch sensor to a first side of the front light guide module of claim 1 through a first adhesive layer;
laminating a reflective display to a second side of the front light guide module through a second adhesive layer, wherein the first side and the second side of the front light guide module face away from each other; and
laminating a cover having the shielding layer to the touch sensor through a third adhesive layer, such that the cover and the front light guide module are located on two opposite sides of the touch sensor,
wherein the shielding layer faces the touch sensor and is in contact with the third adhesive layer, and a thickness of the third adhesive layer is larger than a thickness of the first adhesive layer and larger than a thickness of the second adhesive layer.

7. The front light guide module of claim 1, wherein the top surface of the light guide plate is equipped with the plurality of optical microstructures, and the plurality of optical microstructures protrude above the top surface of the light guide plate.

8. The front light guide module of claim 1, wherein the bottom surface of the light guide plate is equipped with the plurality of optical microstructures, and the plurality of optical microstructures protrude below the bottom surface of the light guide plate.

9. The front light guide module of claim 1, wherein a density of the optical microstructures in a first region of the light guide plate is different than a density of the optical microstructures in a second region of the light guide plate further away from the light source module than the first region.

10. The front light guide module of claim 1, wherein a density of the optical microstructures in a first region of the light guide plate is greater than a density of the optical microstructures in a second region of the light guide plate further away from the light source module than the first region.

11. The front light guide module of claim 1, wherein the light source module has a first width and the composite light path adjustment layer has a second width greater than the first width.

12. The front light guide module of claim 1, wherein a space is defined between the plurality of light-emitting diodes and the light guide plate and between the opaque reflective surface and the composite light path adjustment layer.

13. The front light guide module of claim 1, wherein a first portion of the top surface of the light guide plate is concealed by the composite light path adjustment layer and a second portion of the top surface of the light guide plate is exposed from the composite light path adjustment layer.

14. The front light guide module of claim 1, wherein the composite light path adjustment layer extends over the light guide plate by a first distance from the side-lit surface of the light guide plate, the light source module extends under the light guide plate by a second distance from the side-lit surface of the light guide plate, and the second distance is less than the first distance.

15. The touch display device of claim 5, further comprising:
a first adhesive layer disposed between the touch sensor and the front light guide module;
a second adhesive layer disposed between the front light guide module and the reflective display; and
a third adhesive layer disposed between the cover and the touch sensor,
wherein a thickness of the third adhesive layer is larger than a thickness of the first adhesive layer and larger than a thickness of the second adhesive layer.

16. The touch display device of claim 15, wherein the distance between the composite light path adjustment layer and the boundary where the visible area meets the peripheral area is less than a distance between the light source module and the boundary where the visible area meets the peripheral area.

17. The manufacturing method of the touch display device of claim 6, wherein laminating the cover to the touch sensor is carried out after laminating the touch sensor and laminating the reflective display to the front light guide module.

18. The manufacturing method of the touch display device of claim 6, wherein the thickness of the first adhesive layer and the thickness of the second adhesive layer are respectively from 50 mm to 75 mm, and the thickness of the third adhesive layer is from 100 mm to 125 mm.

19. The front light guide module of claim 12, wherein the light guide plate is connected to the flexible circuit board by an adhesive layer, and the space is further defined by a sidewall of the adhesive layer.

* * * * *